(12) United States Patent
Mohammed et al.

(10) Patent No.: US 11,416,547 B2
(45) Date of Patent: Aug. 16, 2022

(54) METHOD AND SYSTEM FOR QUERYING AN XML DATABASE

(71) Applicant: KING FAHD UNIVERSITY OF PETROLEUM AND MINERALS, Dhahran (SA)

(72) Inventors: Salahadin Adam Mohammed, Dhahran (SA); El-Sayed M. El-Alfy, Dhahran (SA); Ahmed F. Barradah, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 772 days.

(21) Appl. No.: 15/271,848

(22) Filed: Sep. 21, 2016

(65) Prior Publication Data

US 2018/0081944 A1 Mar. 22, 2018

(51) Int. Cl.
*G06F 16/00* (2019.01)
*G06F 16/835* (2019.01)
(52) U.S. Cl.
CPC .................. *G06F 16/8365* (2019.01)
(58) Field of Classification Search
CPC .................................................. G06F 16/8365
USPC ......................................................... 707/719
See application file for complete search history.

(56) References Cited

U.S. PATENT DOCUMENTS

| 7,873,627 B2 | 1/2011 | Grabs et al. |
| 8,176,084 B2 | 5/2012 | Chowdhury |
| 2003/0212698 A1* | 11/2003 | Mani .................. G06F 8/34 707/999.102 |
| 2004/0006004 A1* | 1/2004 | Koulu .................. A61P 35/00 514/5.1 |

(Continued)

FOREIGN PATENT DOCUMENTS

CN 101504660 A1 8/2009

OTHER PUBLICATIONS

Mohammed, Salahadin et al., "Online prime labeling and generation of synopsis for XML query estimation," IEEE, May 7, 2015. (Year: 2015).*

(Continued)

*Primary Examiner* — Alexandria Y Bromell
(74) *Attorney, Agent, or Firm* — Oblon, McClelland, Maier & Neustadt, L.L.P.

(57) ABSTRACT

A method is provided for selecting a query execution plan, including: receiving an XML document including a plurality of root nodes and a plurality of leaf nodes; determining root-to-leaf paths based on the plurality of root nodes and the plurality of leaf nodes; generating a prime number for each unique root-to-leaf path; calculating a number of instances in which each prime number appears; generating an XML synopsis based on the prime numbers and the number of instances; determining a comparison between a query tree pattern and the XML synopsis; determining a type of the query tree pattern; calculating for each query tree pattern plan, a selectivity estimate based on the comparison and the (Continued)

type of the query tree pattern; determining an optimal query execution plan based on the selectivity estimate; and selecting the optimal query execution plan for performing a query of the XML document based on the determination.

18 Claims, 16 Drawing Sheets

(56) References Cited

U.S. PATENT DOCUMENTS

| | | | | |
|---|---|---|---|---|
| 2004/0060003 A1* | 3/2004 | Mani | ............... | G06F 40/154 715/234 |
| 2006/0212860 A1* | 9/2006 | Benedikt | ............... | G06F 40/143 717/144 |
| 2008/0114803 A1* | 5/2008 | Chinchwadkar | .... | G06F 16/8365 707/707 |

OTHER PUBLICATIONS

Salahadin Mohammed et al. (Online Prime Labeling and Generation of Synopsis for XML Query Estimation, 2015 6th International Conference on Information and Communication Systems, IEEE, pp. 19-24) (Year: 2015).*

Mohammed, S., et al., "Selectivity estimation of extended XML query tree patterns based on prime number labeling and synopsis modeling", Simulation Modelling Practice and Theory, vol. 64, pp. 30-42 (2016).

Mohammed, S., et al., "Online Prime Labeling and Generation of Synopsis for XML Query Estimation", $6^{th}$ International Conference on Information and Communication Systems (ICICS), pp. 19-24, (2015).

Hachicha, M., et al., "A Survey of XML Tree Patterns", IEEE Transactions on Knowledge and Date Engineering, vol. 25, No. 1, Total 18 Pages, (2013).

"Literature Review", URL: http://shodhganga.inflibnet.ac.in/bitstream/10603/13374/8/08_chapter%203.pdf, Total 17 pages, (Oct. 4, 2013).

Luo, C., et al., "A Sampling Approach for XML Query Selectivity Estimation", Proceedings of the 12th International Conference on Extending Database Technology: Advances in Database Technology (EDBT '09), Total 10 pages, (2009).

* cited by examiner

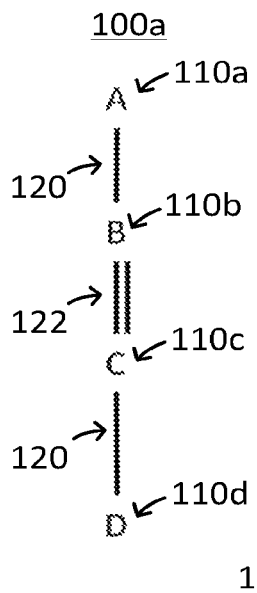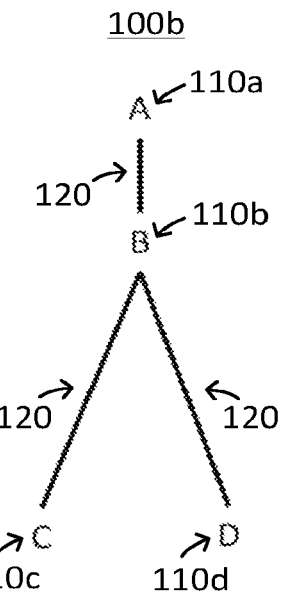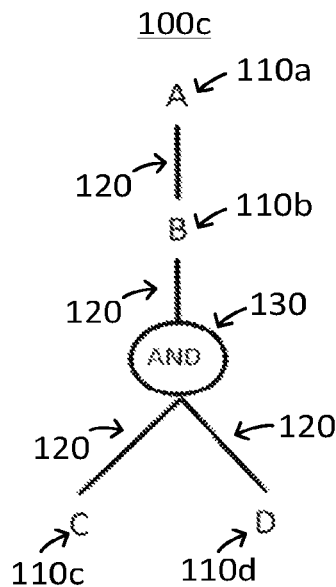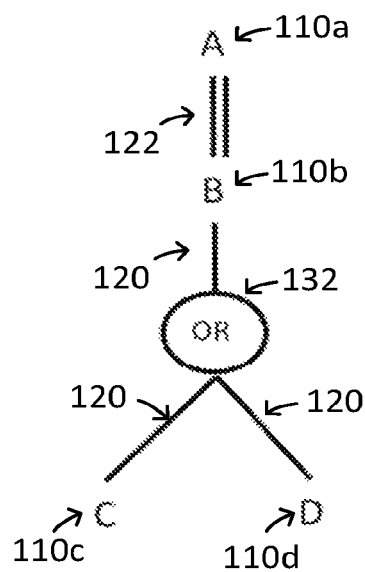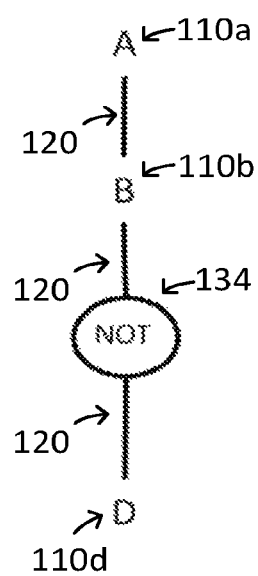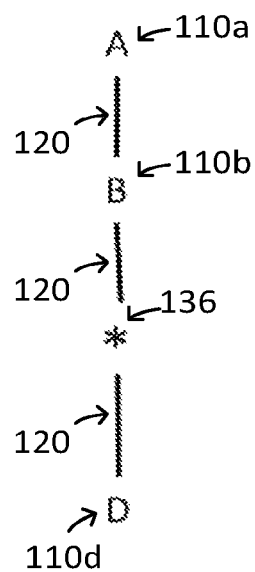

FIG. 4A
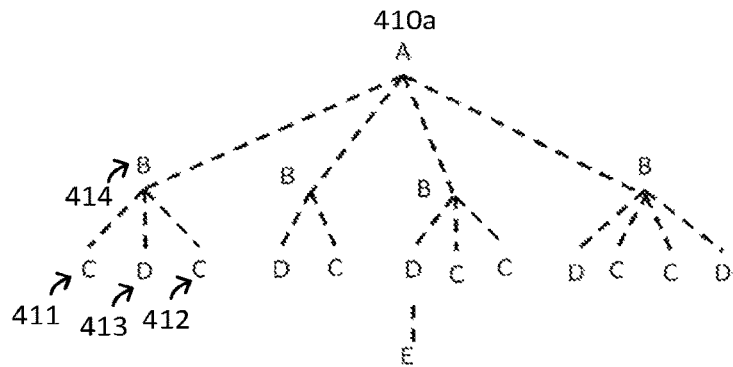
FIG. 4B
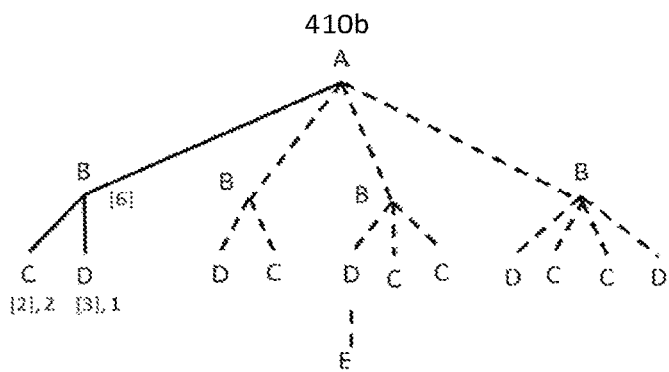
FIG. 4C
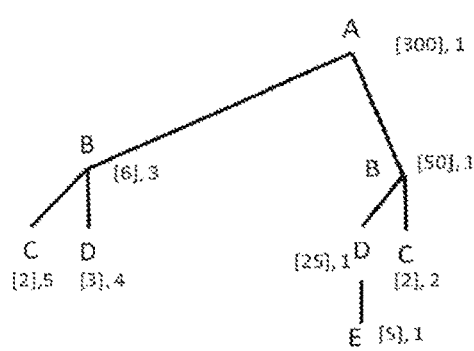
FIG. 4D
| Path | Label |
|---|---|
| /A/B/C | 2 |
| /A/B/D | 3 |
| /A/B/D/E | 5 |

500

600

| NID | Node Stream |
|---|---|
| A | {1,15,0,1} |
| B | {2,6,1,3}, {7,14,11,1} |
| C | {4,5,2,5}, {12,13,2,2} |
| D | {3,4,2,5},{8,11,2,4} |
| E | {9,10,3,1} |

610 → NID
620 → Node Stream

FIG. 7

SelectivityEstimator Algorithm 700

Require: $\tilde{X}, QTP$
Ensure: $\|QTP\|$
1:   $Q \leftarrow \text{TransformQTP}(QTP)$;   ←710
2:   $\|QTP\| \leftarrow 0$;
3:   repeat   ←720
4:     $[p, c, TruthValue, Stack] \leftarrow \text{Initialize}(Q)$;
5:     while $c > 0$ do   ←730
6:       $r \leftarrow \text{IdentifyRelation}(p, c, Q, \tilde{X}, TruthValue)$ (800)
7:       if $r$ then   ←740
8:         $\text{MoveToNextNodes}(p, c, Q, Stack)$ (900)
9:       else
10:         $c \leftarrow 0$
11:       end if
12:     end while   (1000)   ←750
13:     if $\text{MatchQTP}(Q, TruthValue)$ && $r$ then   ←760
14:       $\|QTP\| \leftarrow \|QTP\| + \text{CalculateSelectivity}(Q, \tilde{X})$ (1300)
15:     end if
16:     $done \leftarrow \text{AdvanceTargetCursor}(Q, \tilde{X})$   ←770
17:   until $done$
18:   return $\|QTP\|$

FIG. 8

IdentifyRelation Algorithm 800

Require: $p, c, Q, \tilde{X}, TruthValue$
Ensure: update $TruthValue$
1: $k \leftarrow$ AdvanceCursors($p, c, Q, \tilde{X}$)
2: if CheckRelation($p, c, \tilde{X}$) then
3:     if $k == 0$ then
4:         $TruthValue[c] \leftarrow TRUE$
5:     else if $k == 1$ then
6:         $TruthValue[c] \leftarrow FALSE$
7:         if $Q.Operator[c] ==$ "NOT" then
8:             SetDecendentsFalse($c, Q, TruthValue$)
9:             $Q.ChildNum[c] \leftarrow Q.ChildCount[c]$
10:         end if
11:     end if
12:     return $TRUE$;
13: end if
14: return $FALSE$;

FIG. 9

MoveToNextNodes Algorithm 900

Require: $p, c, Q, Stack$
Ensure: update $p, c$
1: if HasNextChild($c, Q$) then
2:     $p \leftarrow c$
3:     $c \leftarrow$ GetNextChild($p, Q, Stack$)
4: else if ! $Stack.Empty()$ then
5:     $p \leftarrow Stack.Pop()$
6:     $c \leftarrow$ GetNextChild($p, Q, Stack$)
7: else
8:     $c \leftarrow 0$
9: end if
10: return

FIG. 10

MatchQTP Algorithm 1000

Require: $Q, TruthValue$
Ensure: Check match
1: $Matched \leftarrow TRUE$
2: if $Q.QTPType == $ "AND-QTP"$||Q.QTPType == $ "*-QTP" then
3:    for $(i = 2; i \leq Q.NumRows; i++)$ do
4:       $Matched \leftarrow Matched$ AND $TruthValue[i]$
5:    end for
6: else if $Q.QTPType == $ "OR-QTP" then
7:    $Matched \leftarrow MatchOR(Q, TruthValue)$ ← 1200
8: else
9:    $Matched \leftarrow MatchNOT(Q, TruthValue)$ ← 1100
10: end if
11: return $Matched;$

FIG. 11

MatchNOT Algorithm 1100

```
Require: Q, TruthValue
Ensure: Check NOT match
 1:  TruthValue[1] ← TRUE                              ← 1110
 2:  for (i = Q.NumRows; i ≥ 1; i − −) do
 3:      Subtree[i] ← TruthValue[i]                    ← 1120
 4:      if Q.ChildCount[i] == 0 then                  ← 1130
 5:          if Q.Operator[i] == "NOT" then            ← 1140
 6:              Subtree[i] ← NOT Subtree[i]           ← 1150
 7:          end if
 8:      else
 9:          for all j ∈ ChildrenOf(i) do              ← 1160
10:              Subtree[i] ← Subtree[i] AND Subtree[j] ← 1170
11:          end for
12:          if Q.Operator[i] == "NOT" then            ← 1180
13:              Subtree[i] ← NOT Subtree[i]           ← 1190
14:          end if
15:      end if
16:  end for
17:  return Subtree[1]
```

FIG. 12

MatchOR Algorithm 1200

```
Require: Q, TruthValue
Ensure: Check OR match
 1:  TruthValue[1] ← TRUE                                    ← 1210
 2:  for (i = Q.NumRows; i ≥ 1; i − −) do       ← 1220
 3:      if Q.ChildCount[i] == 0 then
 4:          Subtree[i] ← TruthValue[i]           ← 1230
 5:      else                                              ← 1240
 6:          for all j ∈ ChildrenOf(i) do
 7:              if Q.Operator[i] == "OR" then   ← 1250
 8:                  Subtree[i] ← Subtree[i] OR Subtree[j]   ← 1260
 9:              else
10:                  Subtree[i] ← Subtree[i] AND Subtree[j]  ← 1270
11:              end if
12:          end for
13:      end if
14:  end for
15:  return Subtree[1]
```

FIG. 13

CalculateSelectivity Algorithm 1300

```
Require: X̃, Q
Ensure: Partial selectivity estimate ||S_i||
 1:  S_i ← GetCurrentNodes(X̃)         ← 1310
 2:  if Q.Class == "Linear" || Q.Class == "Existential" then   ← 1320
 3:      ||S_i|| ← Count(S_i.TargetNode)    ← 1330
 4:  else                                              ← 1340
 5:      ||S_i|| ← Count(S_i.RootNode) ∏_{n ∈ (S_i − S_i.RootNode)} $\frac{Count(n)}{Count(\Phi(n))}$
 6:  end if
 7:  return ||S_i||
```

*//A[/B[/C OR //D]]//E*

QTP Table 1400

| # | Tag | Axis | NextSiblingIndex | Operator | Children FirstChildIndex | ChildCount |
|---|-----|------|------------------|----------|--------------------------|------------|
| 1 | A | // |   | AND | 2 | 2 |
| 2 | B | / | 5 | OR | 3 | 2 |
| 3 | C | / | 4 |   |   |   |
| 4 | D | // |   |   |   |   |
| 5 | E | // |   |   |   |   |

FIG. 15

Table 2

| Dataset | Size (MB) | Total Elements | Unique Elements | Max Depth |
|---|---|---|---|---|
| DBLP | 153 | 3567298 | 33 | 6 |
| SSplay | 7.52 | 179690 | 22 | 7 |
| XMark | 112 | 1666315 | 74 | 12 |

FIG. 16

Table 3

| Dataset | Proposed | | Sampling | |
|---|---|---|---|---|
| | $\varphi^{\tilde{}X}$ | $T^{\tilde{}X}$ (seconds) | $\varphi^{\tilde{}X}$ | $T^{\tilde{}X}$ (seconds) |
| DBLP | 0.005 | 53 | 0.005 | 11.3 |
| SSPlay | 0.045 | 1.7 | 0.3 | 1 |
| XMark | 1.7 | 53 | 1.7 | 7.2 |

FIG. 17

Table 4

| QTP Type | QTP | Actual | Estimated |
|---|---|---|---|
| AND-QTP | //PLAY[//SUBHEAD]//LINE | 47295 | 47295 |
| AND-QTP | //proceedings[/volume]/series | 1478 | 1478 |
| OR-QTP | //mail[//to ‖ //date]/from | 20946 | 20946 |
| OR-QTP | //ACT/SCENE[//SPEAKER]/STAGEDIR ‖ //ACT[//LINE]//TITLE | 5202 | 5202 |
| NOT-QTP | //article[/author][/journal][/volume][//not(url)]/note | 286 | 286 |
| NOT-QTP | //article[/not(author)][//title]/journal | 702 | 702 |
| *-QTP | //bold[//emph]//* | 4480 | 4480 |
| *-QTP | //description//*[/emph]/keyword | 28181 | 28181 |

FIG. 18

Table 5

| Query | | DBLP | | SSplay | | XMark | |
|---|---|---|---|---|---|---|---|
| Axis | Type | Proposed | Sampling | Proposed | Sampling | Proposed | Sampling |
| PC | Linear | 0 | 72 | 0 | 70.6 | 0 | 7.4 |
| PC | Existential | 0 | 60.2 | 0 | 81.1 | 0 | 7.9 |
| PC | Regular | 0.03 | 64.4 | 4.12 | 78.2 | 1.04 | 8.6 |
| AD | Linear | 0 | 80.4 | 0 | 89 | 0 | 6 |
| AD | Existential | 0 | 71.6 | 0 | 98.3 | 0 | 14.5 |
| AD | Regular | 0.18 | 72.1 | 2.77 | 98.5 | 0.93 | 15.3 |

Table 6

| Dataset | PC | | | AD | | |
|---|---|---|---|---|---|---|
| | Linear | Existential | Regular | Linear | Existential | Regular |
| DBLP | 0 | 0 | 0.03 | 0 | 0 | 0.21 |
| SSPlay | 0 | 0 | 4.01 | 0 | 0 | 2.83 |
| XMark | 0 | 0 | 0.98 | 0 | 0 | 0.88 |

Table 7

| Dataset | PC | | | AD | | |
|---|---|---|---|---|---|---|
| | Linear | Existential | Regular | Linear | Existential | Regular |
| DBLP | 0 | 0 | 0.05 | 0 | 0 | 0.2 |
| SSPlay | 0 | 0 | 4.9 | 0 | 0 | 3.54 |
| XMark | 0 | 0 | 1.6 | 0 | 0 | 0.87 |

Table 8

Table 8: MAPE values of the proposed algorithm for the *-QTP

| Dataset | PC | | | AD | | |
|---|---|---|---|---|---|---|
| | Linear | Existential | Regular | Linear | Existential | Regular |
| DBLP | 0 | 0 | 0.05 | 0 | 0 | 0.2 |
| SSPlay | 0 | 0 | 4.9 | 0 | 0 | 3.54 |
| XMark | 0 | 0 | 1.6 | 0 | 0 | 0.87 |

METHOD AND SYSTEM FOR QUERYING AN XML DATABASE

BACKGROUND

Field

The present disclosure relates to XML databases and data management systems and methods of querying the XML databases.

SUMMARY

A method is provided for selecting a query execution plan, including: receiving an XML document including a plurality of root nodes and a plurality of leaf nodes; determining root-to-leaf paths based on the plurality of root nodes and the plurality of leaf nodes; generating a prime number for each unique root-to-leaf path; calculating a number of instances in which each prime number appears; generating an XML synopsis based on the prime numbers and the number of instances; determining a comparison between a query tree pattern and the XML synopsis; determining a type of the query tree pattern; calculating for each query tree pattern plan, a selectivity estimate based on the comparison and the type of the query tree pattern; determining an optimal query execution plan based on the selectivity estimate; and selecting the optimal query execution plan for performing a query of the XML document based on the determination.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 1A-1F show examples of query tree pattern (QTP) types;

FIG. 4A shows an example of a XML query tree or a tree stream as an input to the synopsis generator;

FIG. 4B shows an intermediate tree according to an example;

FIG. 4C shows an example of a tree stream forming the synopsis as a result of performing a synopsis method according to an example;

FIG. 4D is a corresponding dataguide for the tree stream in FIG. 4C according to an example;

FIG. 7 shows pseudo-code for performing steps of a SelectivityEstimator Algorithm according to an example;

FIG. 8 shows pseudo-code for performing steps of a IdentifyRelation Algorithm according to an example;

FIG. 9 shows pseudo-code for performing steps of a MoveToNextNodes Algorithm according to an example;

FIG. 10 shows pseudo-code for performing steps of a MatchQTP Algorithm according to an example;

FIG. 11 shows pseudo-code for performing steps of a MatchNOT Algorithm according to an example;

FIG. 12 shows pseudo-code for performing steps of a MatchOR Algorithm according to an example;

FIG. 13 shows pseudo-code for performing steps of a CalculateSelectivity Algorithm according to an example;

FIG. 15 is a table of benchmark datasets according to an example;

FIG. 16 is a table of a storage ratio and generation time of an XQuest method and a Sampling Algorithm according to an example;

FIG. 17 is a table of randomly selected sample QTPs and their actual and expected matches according to an example;

FIG. 18 is a table of a Mean Absolute Percentage Error (MAPE) of the AND-QTP of the XQuest method and the Sampling Algorithms according to an example;

Figure 2A:
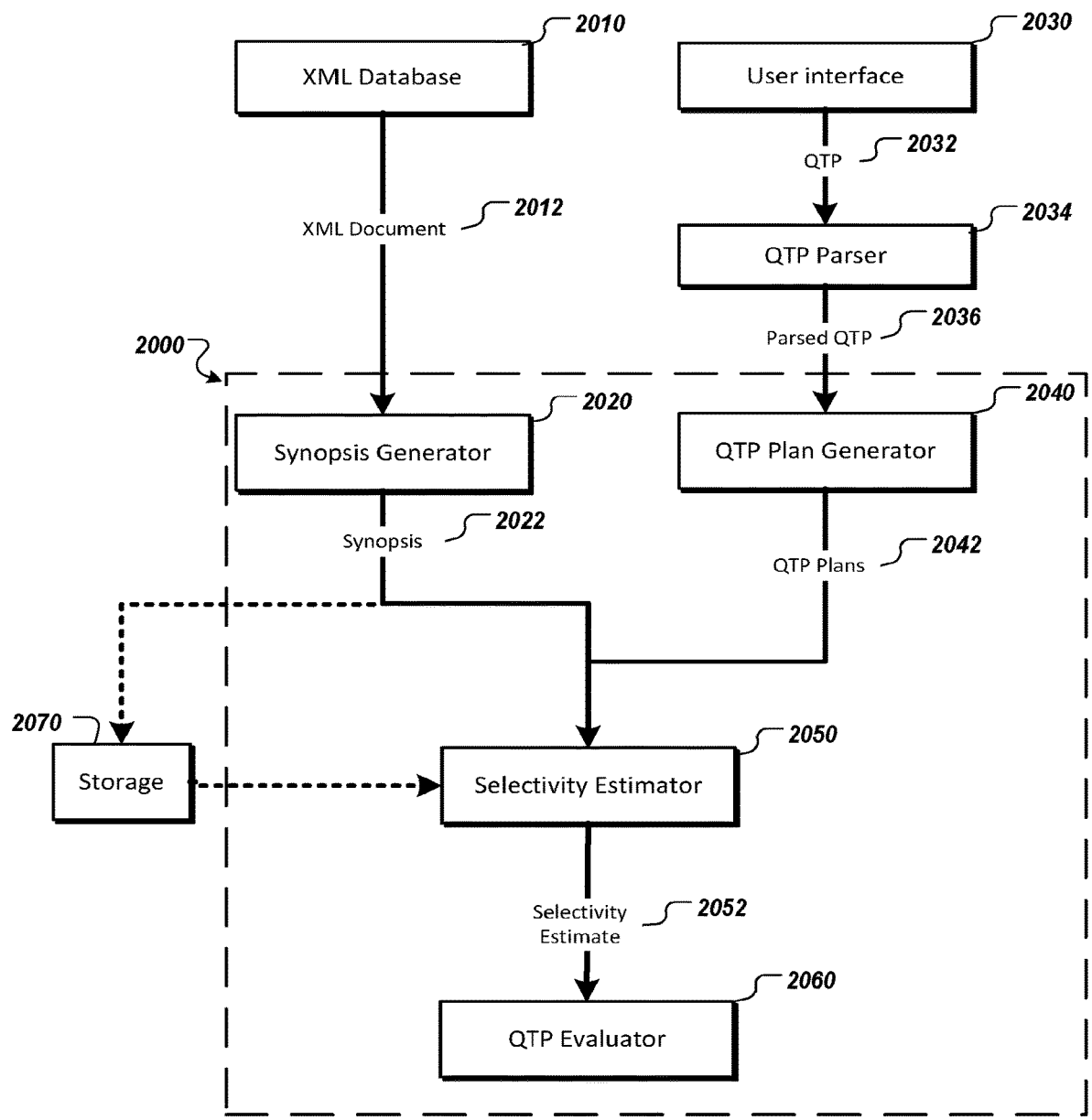
FIG. 2A shows a diagram of a set of components of an XQuest system including a database query optimizer having a synopsis generator, a QTP plan generator, a selectivity estimator, and a query evaluator according to an example.

DETAILED DESCRIPTION eXtensible Markup Language (XML) is a ubiquitous standard format for data representation and exchange among various applications and systems including an XML Database Management (XDBM) System. Data and XML documents can be searched by a query tree (query) which is a declarative expression and is typically written in XPath or XQuery languages recommended by the W3C Consortium. A query can have a plurality of document nodes (nodes) whose relationships are represented by a Query Tree Pattern (QTP). A sequence of evaluating different parts of a given query is known as query plan. A query optimizer can be used to generate multiple query plans and compare them to select the cheapest query plan to execute.

A system for querying an XML database (XQuest system) is provided including a database query optimizer that is configured to determine a best possible query plan in order to improve efficiency of processing. In an example, the database query optimizer includes a synopsis generator, a QTP plan generator, a selectivity estimator, and a query evaluator. The synopsis generator is configured to generate a synopsis, which is a summary of the XML document in a compact form based on simultaneous implementation of prime labeling and merging of structurally-identical subtrees (i.e., siblings) of the XML document.

The QTP plan generator is configured to find and retrieve all matches of each QTP in a given synopsis. The selectivity estimator is configured to determine a selectivity estimation of intermediate results generated by each query plan.

The selectivity estimator is configured to support querying by an extended QTP that can contain a logical operator such as AND, OR, and NOT, as well as a * wildcard.

The selectivity estimator allows for processing of different types of queries, to handle large datasets with different structural characteristics, and to be efficient in terms of accuracy, CPU cost, and memory space consumption.

A method for querying an XML database (XQuest method) is provided that can be used for proliferation of XML documents as well as for representing and exchanging data over the Internet. The XQuest method includes two main steps. A first step includes generating the synopsis. A second step includes range-labeling the synopsis and creating, for each QTP, a set of node streams which can be used to calculate a selectivity estimate. Performance of the XQuest method on three XML benchmark datasets (synopsis generation time, storage requirements, and estimation accuracy) demonstrate that the XQuest method can have more accurate estimates with low memory and time requirements. The selectivity estimate can be used to compare alternative query execution plans and enable the database query optimizer to select the cheapest query plan.

The disclosed method improves speed of the XML synopsis generator and reduces the size of the required storage for the synopsis. The method also provides more accurate estimates for various types of QTPs. Subsequently, the query response time and the interaction between computing devices over a network is enhanced.

Referring now to the drawings, wherein like reference numerals designate identical or corresponding parts throughout the several views.

FIGS. 1A-1F show examples of query tree patterns (QTP) 100a-f which can be characterized based on a relationship of their nodes 110a-d. In written format, a parent-child (PC) relationship is denoted by a forward slash (/) between a pair of nodes and an ancestor-descendent (AD) relationship is denoted by double forward slashes (//) between the pair of nodes.

The QTP 100a shown in FIG. 1A can be written as /A/B//C/D. The QTP 100b shown in FIG. 1B can be written as /A/B[/C]/D. The QTP 100c shown in FIG. 1C can be written as /A/B/(C AND D). The QTP 100d shown in FIG. 1D can be written as /A//B/(C OR D). The QTP 100e shown in FIG. 1E can be written as /A/B/(NOT D). The QTP 100f shown in FIG. 1F can be written as /A/B/*/D.

In an aspect, each QTP can be classified as a linear QTP 100a, 100e, 100f, as shown in FIGS. 1A, 1E, and 1F respectively, and a branching or twig QTP 100b, 100c, 100d, as shown in FIGS. 1B, 1C and 1D respectively. In a linear QTP, each node has at most one child node, whereas in a twig QTP at least one node has two or more child nodes.

In an aspect, each QTP can be a basic QTP or an extended QTP. FIGS. 1A and 1B are examples of a basic QTP whereas FIGS. 1C-1F show examples of extended QTPs. An extended QTP is a more general form of QTP which may contain one or more logical operators or wildcards. The queries in FIGS. 1C, 1D, 1E and 1F can be denoted as AND-QTP 100c, OR-QTP 100d, NOT-QTP 100e, and *-QTP 100f, respectively.

In an aspect, the AND-QTP can be easily converted to an equivalent basic QTP. For example, the QTP 100b and the QTP 100c are equivalent. Other extended queries can have multiple basic QTPs that satisfy the given query.

Twig queries have a number of the branches and are further classified as existential when their branches are only treated as existential structural constraints, but the number of the branches is ignored; otherwise, they are called regular twig queries. For instance, the existential twig query A[/B]/C counts only C nodes whose parent A node has at least one B child node; in other words the branch [/B] is treated as a structural constraint.

XQuest System

FIG. 2A is shows a high-level outline of components of an XQuest system including a database query optimizer 2000 having a synopsis generator 2020, a QTP plan generator 2040, a selectivity estimator 2050, and a query evaluator 2060.

In some implementations, the synopsis generator 2020 is configured to receive an XML document (X) 2012 as an input and to generate a synopsis 2022 as an output. In an example, the XML document (X) 2012 is accessed from an XML database 2010. Optionally, the synopsis 2022 can be stored in a storage 2070 such as memory 2102 (See FIG. 2B). In an example, a user interface 2030 is configured to receive a QTP 2032 and a QTP parser 2034 is configured to generate a parsed QTP 2036 based on the QTP 2032. The QTP plan generator 2040 is configured to receive the parsed QTP 2036 and generate a set of QTP plans 2042 corresponding to the synopsis 2022.

The selectivity estimator 2050 is configured to receive the synopsis 2022 and the set of QTP plans 2042 as inputs and to generate a selectivity estimate (||QTP||) 2052 corresponding with each QTP plan 2042 as an output. The QTP evaluator 2060 is configured to receive the selectivity estimate 2052 and select a query plan 2042 based on the selectivity estimate 2052.

In some implementations, the XQuest system is composed of additional hardware components including database servers, query processors, parsers, estimators, memory, storage devices, document transformers, loaders, LAN/WAN network interfaces, and other related networking hardware. Some of these hardware components, according to exemplary embodiments, are described with reference to FIGS. 2B and 2C below.

Figure 2B:
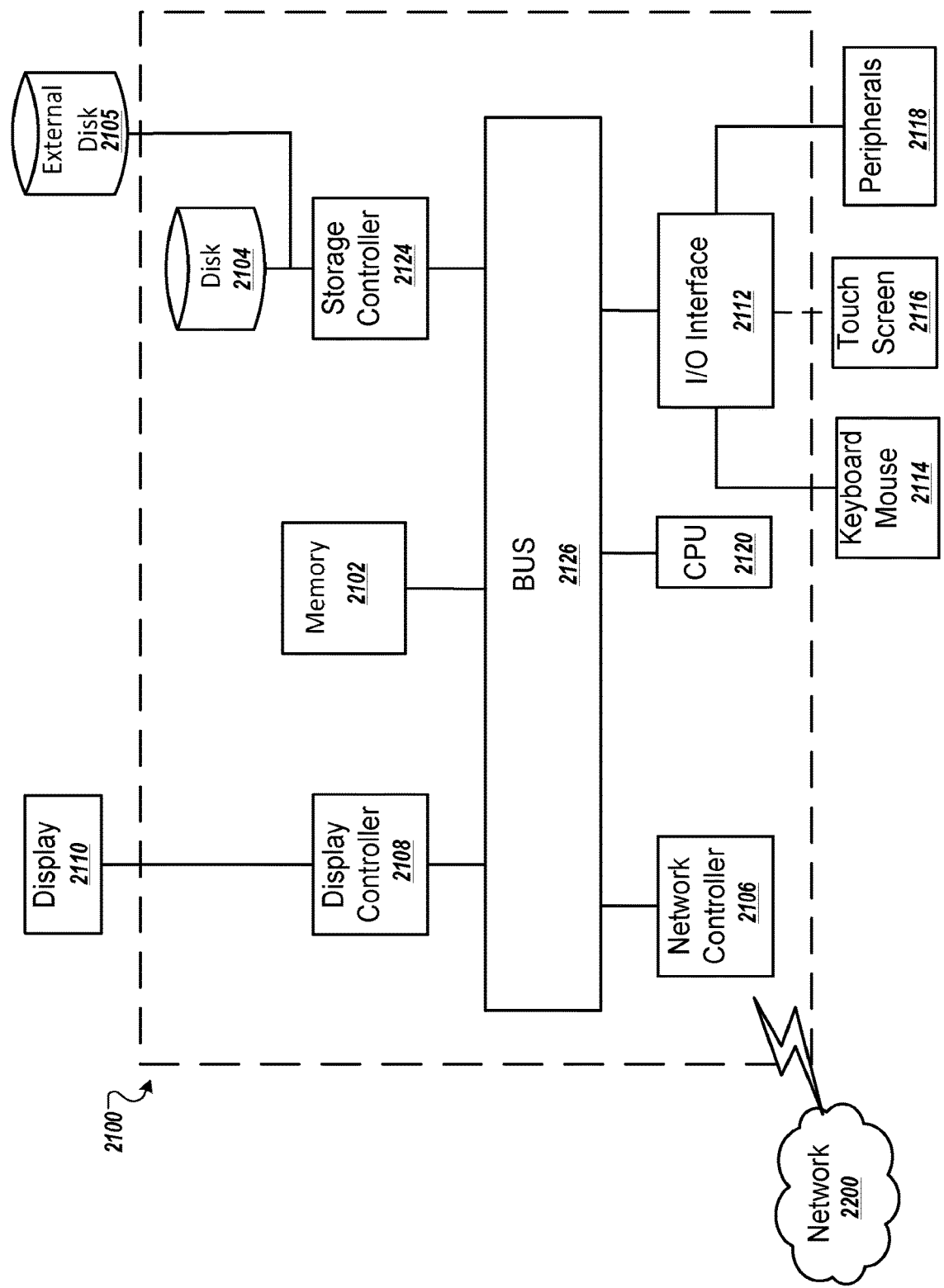
FIG. 2B shows an exemplary block diagram of a computing device hardware embodying the disclosed disclosure.
Figure 2C:
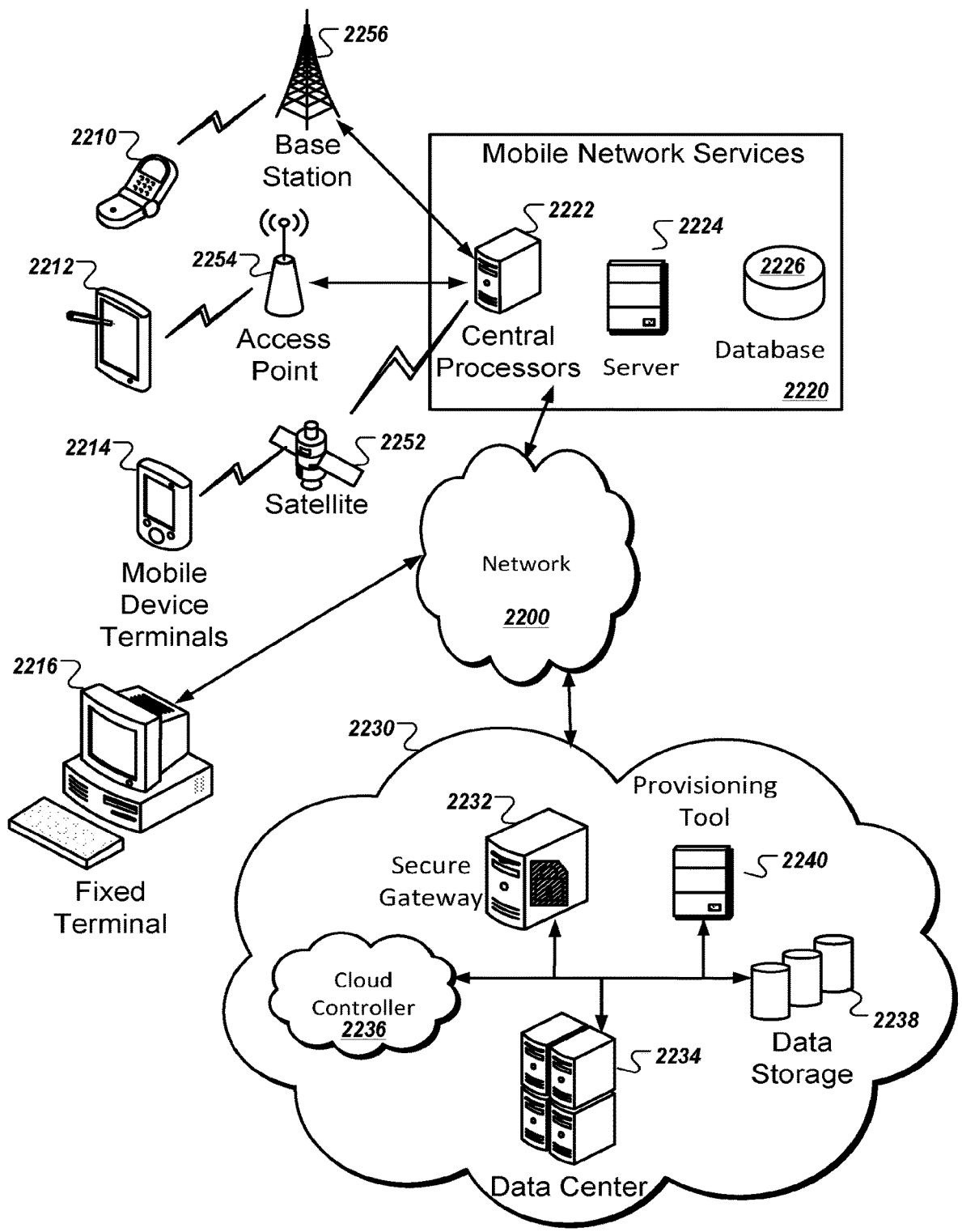
FIG. 2C shows an exemplary system having distributed components which may share processing for the computing device hardware according to an example.
Figure 2D:
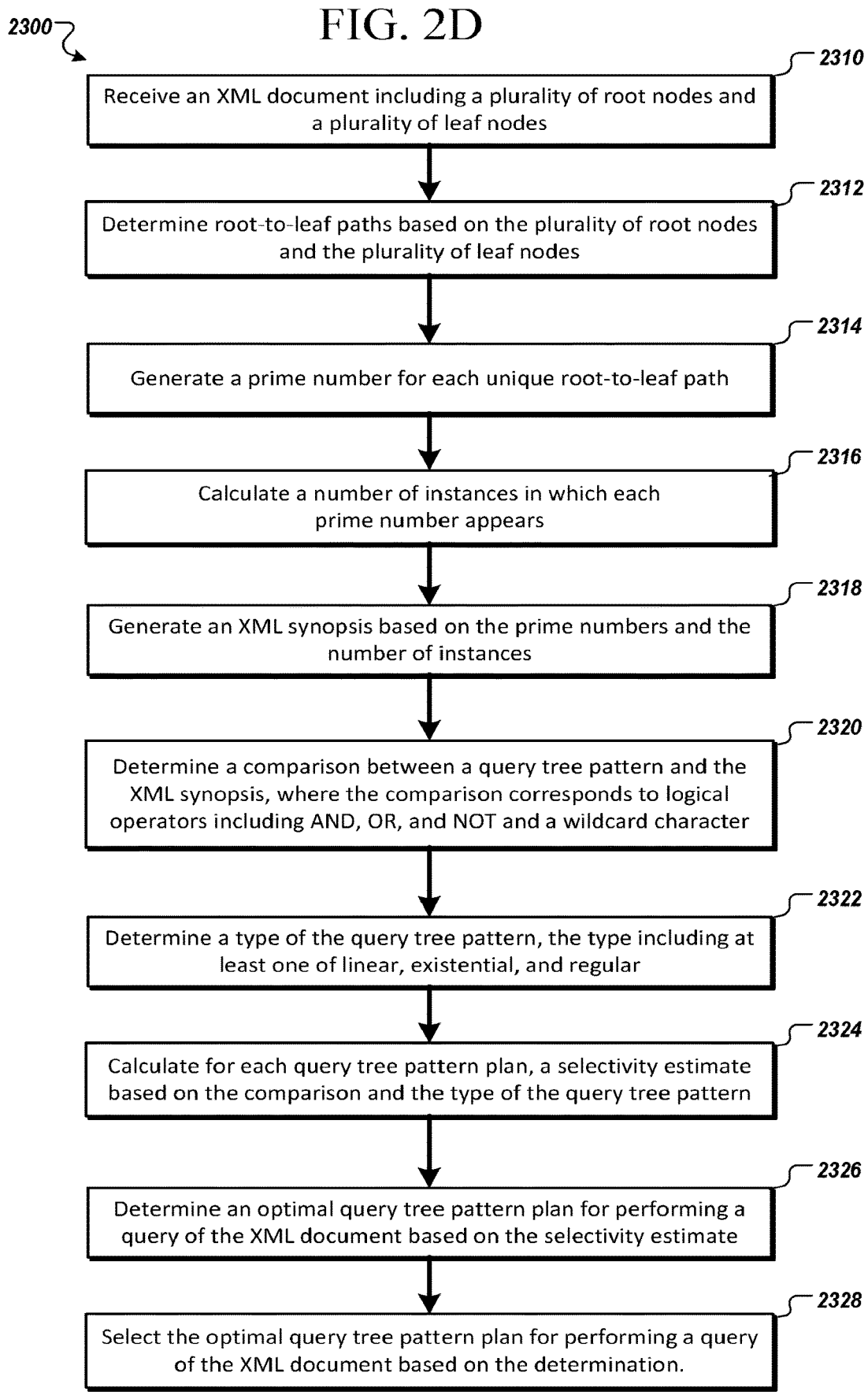
FIG. 2D shows a flowchart of a method for selecting a query execution plan according to an example.

FIG. 2D shows a flowchart of a method 2300 for selecting a query execution plan according to an example. In some implementations, the method 2300 for selecting a query execution plan includes receiving an XML document including a plurality of root nodes and a plurality of leaf nodes (2310), determining root-to-leaf paths based on the plurality of root nodes and the plurality of leaf nodes (2312), generating a prime number for each unique root-to-leaf path (2314), calculating a number of instances in which each prime number appears (2316), generating an XML synopsis based on the prime numbers and the number of instances (2318), determining a comparison between a query tree pattern and the XML synopsis, where the comparison corresponds to logical operators including AND, OR, and NOT and a wildcard character (2320), determining a type of the query tree pattern, the type including at least one of linear, existential, and regular (2322), calculating for each query tree pattern plan, a selectivity estimate based on the comparison and the type of the query tree pattern (2324), determining an optimal query tree pattern plan for performing a query of the XML document based on the selectivity estimate (2326), and selecting the optimal query tree pattern plan for performing a query of the XML document based on the determination. (2328).

Synopsis Generator

In some implementations, the synopsis generator 2020 is configured to use a prime-labeling scheme to ensure that root nodes of subtrees with identical structures have the same label and to test whether two subtrees are identical or not. The nodes are labeled in a bottom-up fashion in an example. As a result, the synopsis generator 2020 is configured to identify all distinct root-to-leaf paths and label each distinct root-to-leaf path with a unique prime number or PathID. Leaf nodes of labeled paths are configured to be labeled with their corresponding PathIDs. When a node is an inner node, the node is assigned a label by multiplying the labels of its children. When there is only one child, the label of the parent node can be a square value of the label of the child node. For example, an inner node n with children, $C=\{C_1, C_2, \ldots, C_m\}$, is labeled as follows in Equation 1:

$$\text{Label}(n) = \begin{cases} \prod_{1}^{m} \text{Label}(C_i) & \text{if } m > 1 \\ [\text{Label}(C_1)]^2 & \text{if } m = 1 \end{cases}$$

In an example, for efficient operation of the synopsis generator 2020, rather than scanning the whole query tree and labeling all nodes before merging, the synopsis generator 2020 can be configured to perform all operations in one scan from left to right in preorder traversal. This enables the synopsis generator 2020 to process a query tree that is streamed as it is received and/or read.

Figure 3:
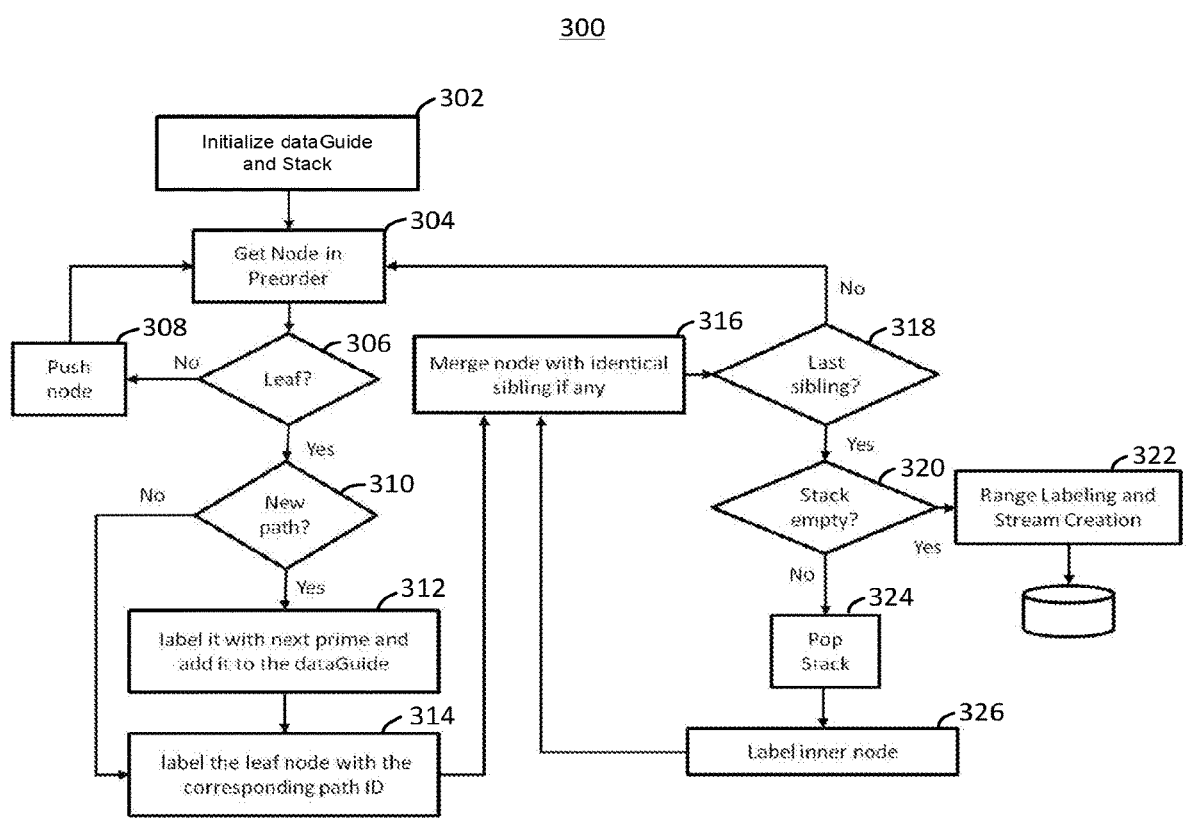
FIG. 3 shows a flow diagram of the synopsis generator according to an example.

FIG. 3 shows a flowchart of a method 300 for generating a synopsis (synopsis method) according to an example. The synopsis method 300 includes a step to merge structurally-identical subtrees (i.e., siblings) of the XML document 2012. When the siblings are merged, the synopsis method 300 keeps one sibling and associates each of its nodes with a merged nodes count. The synopsis method 300 is described as steps that can be performed by the synopsis generator 2020.

At step 302, a stack and a dataguide is initialized. A dataguide can be a table of the labels assigned to each distinct path. (See FIG. 4D)

At step 304, a node is received in a preorder.

At step 306, the node is checked if it is a leaf node. When the node is not a leaf node or is an inner node and not labeled (e.g., return no), the synopsis method 300 advances to step 308 and when the node is a leaf node (e.g., return yes), the method 300 advances to step 310.

At step 308, the node is pushed to the stack and the method 300 returns to step 304.

At step 310, the node is checked if it belongs to a root-to-leaf path not in the dataguide. When the node belongs to a root-to-leaf path not in the dataguide (e.g., return yes), the synopsis method 300 advances to step 312, otherwise when the node is not a new path (e.g., return no), the synopsis method 300 advances to step 314.

At step 312, the root-to-leaf path is labeled with a distinct prime number or PathID and added to the dataguide.

At step 314, the node is determined to be a leaf node and the node is labeled with the label of its labeled path or PathID.

At step 316, when the node is labeled and has an identical sibling, the node is merged with that sibling.

At step 318, when the node is the last sibling (e.g., return yes), the synopsis method 300 advances to step 320. At step 318, when the node is not the last sibling (e.g., return no), the synopsis method 300 returns to step 304.

At step 320, when the stack is empty (e.g., return yes), the synopsis method 300 advances to step 322.

At step 320, when the stack is not empty (e.g., return no), the synopsis method 300 advances to step 324 where a node is received (i.e., popped) from the stack and at step 326 the node is labeled according to Equation 1. When the node has an identical sibling, the synopsis method 300 returns to step 316 where the nodes are merged and the step 318 is repeated.

At step 322, all nodes in the generated synopsis 2022 are relabeled using a node labeling scheme for efficient operation of the selectivity estimator 2050 and terminates.

Node Labeling

Node labeling of a set of XML document nodes is done in order to identify the parent-child, ancestor-decedent, and sibling relationships between the set of nodes. The node labeling of the XML document nodes can be done in several ways including range-labeling, prefix-labeling, and multiplicative-labeling.

Figures 5, 6:
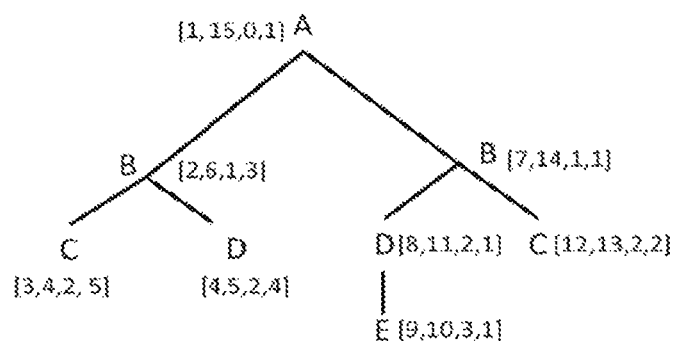
FIG. 5 is an illustrative example for operation of a range-labeling scheme on the query tree pattern according to an example.
FIG. 6 is a node stream table having a set of node IDs and a corresponding set of node streams according to an example.

The range-labeling scheme for each node includes a step of assigning a vector [s,e,l,c] corresponding a node start (s), a node end (e), a node level (l), and a node count (c), as shown in FIG. 5. The start and the end can be assigned by traversing the query tree in the preorder and assigning the next integer to s, when the node is first visited, and the next integer to e when the node is last visited. In an example, each node n is associated with a node start (n.start), a node end (n.end), and a node level (n.level), where n.start<n.end. When the node p is a parent of node c, then p.start<c.start, p.end>c.end, p.level=c.level−1. The node level of the root node is 0. When the nodes s1 and s2 are siblings, and s1 is on the left of s2, then s1.end<s2.start.

In prefix-labeling, such as Dewey labeling, a node at level k is assigned a string of k numbers separated by a delimiter. For example, a node n at level 3 is labeled x.y.z, where x.y is the label of its parent node at level 2, and x is the label of its ancestor node at level 1. No two siblings are assigned the same label.

In multiplicative-labeling, such as prime labeling, the node label is the product of the labels of some other nodes. For example, in prime labeling scheme, nodes are labeled in either top-down or bottom-up fashion. In top-down variant each node is assigned a unique prime number known as a self-label and a label which is the product of its parent's label and its self-label. In multiplicative-labeling, a node x is a descendent of node y when the label of x is divisible by the label of y. In a bottom-up variant, the child nodes can be labeled before the parent nodes and the label of a parent node can be a product of its children's labels.

Example of Operation of the Synopsis Generator

FIGS. 4A-4D illustrate operation of the synopsis generator 2020 according to an example, where FIGS. 4A-4C illustrate a process of reading an XML document with intermediate steps. FIG. 4A shows a XML query tree or a tree stream 410a that will be an input to the synopsis generator 2020 in this example. FIG. 4B shows an intermediate tree 410b and FIG. 4C shows an example of a tree stream 410c forming the synopsis 2022 as a result of performing the synopsis method 300. A corresponding dataguide 420 is shown in FIG. 4D.

Returning to FIG. 4A, the nodes of the tree stream 410a are arranged in a preorder and are pushed into a stack until reaching a first node C 411 on a left branch of the tree stream 410a. As shown, a path /A/B/C has not yet been labeled. Comparing the tree stream 410a in FIG. 4A and intermediate tree 410b in FIG. 4B, the path /A/B/C is labeled with a PathID (e.g., 2) and pushed to a dataguide 420 (See FIG. 4D). The node C 412, which is a leaf node, is also labeled with the PathID. Since the node C 411 is the only node with the PathID and a node count for the node C is initialized to 1.

Next, the synopsis generator 2020 is configured to read a node D 413 and to label the path /A/B/D with a different prime number (e.g., 3). The node D 413 is also labeled 3 and a node count for the node D 413 is initialized to 1.

Next, the synopsis generator 2020 is configured to read a node C 412.

Since the path /A/B/C is already labeled, the node C 412 is labeled with the same PathID, which is 2.

Since the node C 412 has an identical sibling, both nodes 411, 412 are merged and the node count with respect to the node C 411 is incremented to 2.

Next, a node B 414 is assigned a label by multiplying its children's labels (2 by 3), such that the node B label becomes 6 and the node count for the node B 414 is initialized to 1. The intermediate tree stream 410b at this step is as shown in FIG. 4B. The synopsis generator 2020 proceeds until the whole tree stream 410a is processed, resulting in the synopsis 2022 shown in FIG. 4C.

In an aspect, the range-labeling scheme can organize all nodes into a set of node streams 620 such that each node with a same node ID 610 (NID) is put into a respective node stream, as shown in FIG. 6. Nodes in each stream can be sorted in ascending order according to their start labels. The set of node streams 620 make up the synopsis 2022 generated for the XML document 2012 according to an example.

Selectivity Estimator

The selectivity estimator 2050 is configured generate the selectivity estimate 2052 of the QTP 2032 based on the synopsis 2022 generated from the synopsis generator 2020.

SelectivityEstimator Algorithm

An example of pseudo-code for performing steps of the selectivity estimator 2050 is shown as SelectivityEstimator Algorithm 700 in FIG. 7.

Figures 14A, 14B, 14C:
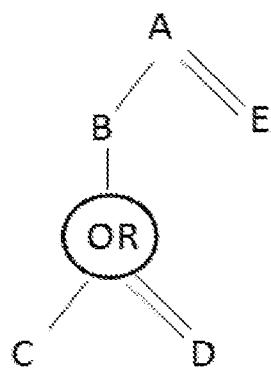
FIG. 14A is a QTP in written form according to an example.
FIG. 14B shows the QTP of FIG. 14A as a respective tree stream according to an example.
FIG. 14C shows the QTP of FIGS. 14A and 14B as a respective QTP table according to an example.

At step 710, the TransformQTP function 600 is configured to transform the QTP 2032 into the QTP table. Since QTP is a tree pattern, the transformation is straightforward by traversing the tree in preorder and populating the table where the row number corresponds to the order in which the node is visited. For example, a QTP given as //A[/B[/C OR //D]]//E in written form, as shown in FIG. 14A, is transformed to a respective QTP table 1400 as shown in FIG. 14C. TransformQTP function creates a data structure Q containing the QTP table 1400 and other parameters such as size, root node, target node, Q.Operator[c], which is set as the operator of node c from the QTP table, Q.NumRows is the number of rows in the QTP table, Q.ChildCount[c] is the ChildCount for node c from the QTP table, Q.QTPType is the type of QTP logical operator or wildcard, and Q.Class is the type of query. The data structure Q can also contain other temporary variables.

At step 720, the Initialize function takes the data structure Q as input and initializes the parameters [p, c, TruthValue, Stack].

At step 730, the SelectivityEstimator Algorithm 700 identifies all subtrees in the synopsis 2022 that match the QTP 2032 using the IdentifyRelation Algorithm 800, MoveToNextNodes Algorithm 900, MatchQTP Algorithm 1000, and AdvanceTargetCursor function. According to an example, a set of all matching subtrees can be denoted as $S=S_1, S_2, \ldots, S_{|S|}$, where $|S|$ is a subtree count.

IdentifyRelation Algorithm 800

The IdentifyRelation Algorithm 800 is configured to receive two nodes p and c besides the data structure Q, the synopsis 230, and the TruthValue and to return an updated TruthValue. It moves cursors in the c stream until there is a subtree partially matching the QTP. If the relation between the current cursor-nodes in p and c is a parent-child relation, then the c element of the array variable TruthValue becomes TRUE otherwise it will be FALSE. If the corresponding operator of c is a NOT operator, then the TruthValue elements of the decedents of c are also assigned FALSE. The IdentifyRelation algorithm returns FALSE if the p or c cursor reaches the end of its respective node stream, otherwise the algorithm returns TRUE.

MoveToNextNodes Algorithm 900

The MoveToNextNodes Algorithm 900 assigns node stream pointers p and c to the next two node streams to be compared. For example, for a QTP //A//B//C//D, the node streams A, B, C, and D will be searched for matches. First, p is assigned to node stream A and c to node stream B. Next, p is assigned to node stream B and c is assigned node stream C and so on. Since QTP is a tree pattern, the MoveToNextNodes uses a stack to control the tree traversal.

MatchQTP Algorithm 1000

The MatchQTP Algorithm 1000 is configured to receive the data structure Q and the TruthValue and to return a Check match. Let us denote the subtree formed by the current-nodes as Si which is a valid subtree in the synopsis that potentially matches QTP. MatchQTP checks if Si actually matches the QTP depending on the contained operators. For AND-QTP or a *-QTP, MatchQTP returns TRUE when all the elements of the TruthValue's are true, otherwise MatchQTP returns FALSE. When QTP contains an OR or a NOT operator MatchQTP calls the function MatchOR 1100 or the function MatchNOT 1200, respectively.

MatchNOT Algorithm 1100

The MatchNOT Algorithm 1100 is configured to receive the data structure Q, and the TruthValue and to return a Check NOT match. Let the subtree pointed to by the current-nodes be called Si. The MatchNOT algorithm starts from the leaf nodes of Si. Each leaf node of Si, whose operator is a NOT, is assigned the opposite value of the corresponding TruthValue element, otherwise the leaf node of Si is assigned that of its TruthValue. The truth value of an inner node is computed by ANDing the truth values of its child nodes. When the operator of the inner node is a NOT, then its truth value is the opposite of the one computed from its child nodes. The computation of truth values continues until that of the root node of Si is computed and the algorithm returns the truth value of the root node of Si.

MatchOR Algorithm 1200

The MatchOR Algorithm 1200 is configured to receive the data structure Q, and the TruthValue and to return a Check OR match. MatchOR starts from the leaf nodes of the current subtree Si in the synopsis that potentially matches QTP that contains OR operator. When two or more nodes are connected by an OR operator and when all their TruthValue elements are FALSE, then the OR subtree is assigned FALSE otherwise the OR subtree is assigned TRUE. Next, the MatchOR algorithm moves to the parent of the OR subtree and repeats. At the end the MatchOR algorithm occurs when the QTP root is reached and is assigned either TRUE or FALSE accordingly and returns that value to the MatchQTP algorithm.

AdvanceTargetCursor

Each QTP has a target node (also known as output node). In the generated synopsis, there is a node stream corresponding to the target node. The role of the AdvanceTargetCursor function is to move the cursor forward in the target node stream to the next node which might be part of a QTP match.

CalculateSelectivity Algorithm

FIG. 13 shows pseudo-code for performing steps of the CalculateSelectivity Algorithm 1300. The CalculateSelectivity Algorithm 1300 configured to receive the data structure Q and the synopsis 2022, and to return a partial estimate ∥Si∥.

When searching for QTP matches, the proposed method uses cursors to point to some nodes and check whether these nodes form a subtree that matches the QTP. Subsequently, the GetCurrentNodes function at step 1310 returns the nodes that are currently pointed to by the cursors, which is then denoted as Si.

At step 1320, a QTP classification is checked. When the type of QTP or classification is a linear QTP or an existential QTP, at step 1330, the partial estimate ∥Si∥ is set to the subtree count associated with the target node. When the QTP is a regular QTP, at step 1340, the partial estimate ∥Si∥ is added to a total QTP estimate ∥QTP∥ or the selectivity estimate 2052 and is computed as follows in Equation 2:

$$\|S_i\| = \text{Count}(S_i \cdot RootNode) \prod_{n \in \{S_i - S_i \cdot RootNode\}} \frac{\text{Count}(n)}{\text{Count}(\Phi(n))}$$

where $\Phi(n)$ is a node directly connected to n as its parent or ancestor.

In an aspect, the existential twigs are treated differently than regular twigs since branches are only treated as existential structural constraints in existential twigs. Therefore, the number of the branches can be ignored and the selectivity estimate 2052 can be computed for the target node in a similar way as a linear QTP. In regular twig queries, the number of branches is important, therefore, duplicate outputs are allowed. For example, a twig query such as //B[/C]/D that runs against the query tree of FIG. 4A, there are 5 matches when it the twig query is considered as an existential twig, but there are 9 matches when twig query is considered as a regular twig.

Performance Example

Next, to demonstrate performance of the XQuest method, a comparison is provided to a state-of-the-art method, Sampling Method, using datasets including DBLP, XMark, and SSplay having characteristics shown in TABLE 2 (FIG. 15), as described in a paper by Mohammed S., Barradah A. F., and El-Alfy E. M., titled "Selectivity estimation of extended XML query tree patterns based on prime number labeling and synopsis modeling," published in Simulation Modelling Practice and Theory, 2016, Vol. 64, p 30-42, the contents herein fully incorporated by reference.

All computer instructions were written in C# and executed on an Intel 2.8 GHz machine with 2 GB RAM running Windows 7 operating system. The performance of the XQuest method was also compared with one of the state-of-the-art algorithms called Sampling Algorithm, using the code provided to the inventors by its proposers and as described in a paper by Luo et. al., titled "A sampling approach for XML query selectivity estimation", published in Proceedings of the 12th International Conference on Extending Database Technology: Advances in Database Technology (EDBT '09), ACM, New York, N.Y., USA, the contents herein fully incorporated by reference.

Three common performance measures were adopted in our study: synopsis size ratio ($\varphi_{\bar{x}}$), synopsis generation time ($T_{\bar{x}}$), and selectivity estimation mean absolute percentage error ($MAPE_{\bar{x},Q}$). The first two measures are evaluated during the synopsis generation whereas $MAPE_{\bar{x},Q}$ is evaluated during the selectivity estimation for each type of QTPs. Since existing selectivity algorithms, including the Sampling Algorithm, support only AND-QTP, $MAPE_{\bar{x},Q}$ comparisons were only carried out for the AND-QTP.

A synopsis size ratio is evaluated as a ratio of a size of the generated synopsis ($S_{\bar{x}}$), to a size of the original XML document ($S_X$), and is given by Equation 3:

$$\phi_{\bar{x}} = \frac{S_{\bar{x}}}{S_X} \times 100 \qquad (3)$$

Estimation errors were tested using 7200 randomly generated QTPs. For each dataset and each type of QTP, 300 PC QTPs and 300 AD QTPs were randomly generated. Each of the 300 PC QTPs were divided into: 100 linear, 100 existential, and 100 regular QTPs. Similarly, each of the 300 AD QTPs were also divided in the same way. The generated QTPs have various characteristics in terms of node tags and number of levels. Each collection of QTPs is referred to as Q. For each case, $MAPE_{\bar{x},Q}$ is computed as follows:

$$MAPE_{\bar{x},Q} = \left(\frac{1}{|Q|} \sum_{i=1}^{|S|} \frac{\text{abs}(\|\hat{Q}_i\| - \|Q_i\|)}{\|\hat{Q}_i\|}\right) \times 100 \qquad (4)$$

where |Q| is the number of queries, and ∥Q^i∥ and ∥Qi∥ are the actual and estimated numbers of matches for query Qi, respectively.

Synopsis Size Ratio and Generation Time

Both measures were evaluated empirically and the attained results are shown in TABLE 3 (FIG. 16) for various datasets for both the XQuest Method and the Sampling Algorithm.

A compactness measure depends on uniformity of the dataset structure.

When the dataset is structurally skewed, a greater memory budget is required and hence $\varphi_{\bar{x}}$ is larger. For example, XMark is more structurally skewed than DBLP, hence XMark requires more memory space for its synopsis.

A size of the synopsis 2022 also depends on the algorithm that generates the synopsis. As can be seen from these results, the Sampling Algorithm required 6.67 times more space for its synopsis of the SSPlay dataset.

Since the Sampling Algorithm randomly picks some subtrees from the XML document 2012 to generate the synopsis 2022, it takes less time than the XQuest method to generate the synopsis 2022. The XQuest method may require more time as it goes through some structural comparison and merging operations to construct a better synopsis that can lead to low estimation error. This is more practical and justifiable since query estimation occurs more often than the generation of a synopsis.

In the case when the original XML document changes, the changes can be over a period of time and hence short-term changes may only slightly affect the estimation accuracy. For significant changes, the synopsis generation can be repeated to update the synopsis.

Estimation Error Rate

For each dataset and for each case of the generated queries, the actual number of matches using the original dataset and the estimated number of matches using the corresponding synopsis were computed.

A random sample of the QTPs and their actual and estimated matches are shown in TABLE 4 (FIG. 17). The MAPE values are computed for each case and are discussed below.

MAPE of AND-QTP

MAPE values of the XQuest method were significantly and consistently lower than that of the Sampling Algorithm when given a same memory budget. The MAPE values for both the proposed and Sampling Algorithms are shown in TABLE 5 (FIG. 18) for each query type and dataset. Computation was done using Eq. 4. For DBLP, the error of the XQuest method was 0 in most of the cases whereas that of Sampling Algorithm ranged between 60.2% and 80.4%. In the worst case, the error of the XQuest method was 0.18%. The average error of the XQuest method was more than 200 times less than that of the Sampling Algorithm. This significant reduction is due to capturing more structural information of the DBLP dataset even with the same memory budget. Similarly, for the SSplay the average error has improved more than 74 times when applying the XQuest method. The Sampling Algorithm did not show any results when $\varphi_{\tilde{x}}$ value was less than 0.3. Hence, $\varphi_{\tilde{x}}$ was set to 0.3 for the Sampling Algorithm, which is about 6.67 times more memory space than for the XQuest method.

Finally, for XMark dataset, the XQuest method error never exceeded 1.04% whereas the XQuest method error ranged between 6% and 15.3% for the Sampling Algorithm. Again, the XQuest method was more than 30 times better than the Sampling Algorithm when both algorithms were allocated equal memory space.

Figures 19, 20, 21, 22:
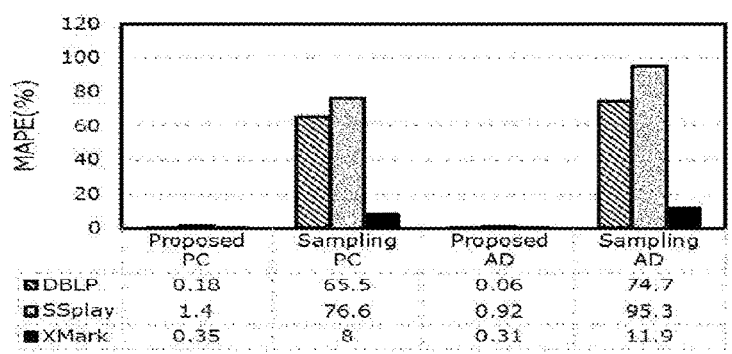
FIG. 19 is a table of MAPE values of the XQuest method for the NOT-QTP according to an example.
FIG. 20 is a table of MAPE values of the XQuest method for the OR-QTP according to an example.
FIG. 21 is a table of MAPE values of the XQuest method for the *-QTP according to an example.
FIG. 22 is a graph showing a comparison of the overall average errors according to an example.

FIG. 22 shows the overall averages of the error results for both algorithms for each dataset and for both the PC and AD QTPs. The XQuest method remarkably outperforms the Sampling Algorithm.

MAPE of NOT-QTP, OR-QTP, and *-QTP

The MAPE results of the NOT-QTP, OR-QTP and *-QTP are as shown in Tables 6, 7, and 8, respectively.

The worst-case for MAPE values were less than 5% which shows high accuracy of the XQuest method. Existing algorithms are limited to AND-QTP so comparisons were not able to be made. The MAPE of the existential and linear QTPs were always 0%. The reason is that the synopsis generated by the XQuest method captures the complete structural information of the XML document 210. The MAPE of the regular QTPs depends on the type of the dataset rather than the type of the QTP. When the dataset has many identical siblings and the number of identical siblings per parent varies, then the MAPE values of the dataset are high. That is why the MAPE values of the SSPlay dataset were higher than that of the other two datasets. The MAPE values of the DBLP are almost 0% due to having very few identical siblings.

Hardware Description

Next, a hardware description of the computing device 2100, mobile computing device, or server according to exemplary embodiments is described with reference to FIG. 2B. In FIG. 2B, the computing device, mobile computing device, or server includes a CPU 2120 which performs the processes described herein. The process data and instructions may be stored in memory 2102. These processes and instructions may also be stored on a storage medium disk 2104 such as a hard drive (HDD) or portable storage medium 2105 or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device, mobile computing device, or server communicates, such as a server or computer.

Further, a portion of the claimed advancements may be provided as a utility application, background daemon, or component of an operating system, or combination thereof, executing in conjunction with CPU 2120 and an operating system such as Microsoft Windows 7, UNIX, Solaris, LINUX, Apple MAC-OS and other systems known to those skilled in the art.

CPU 2120 may be a Xenon or Core processor from Intel of America or an Opteron processor from AMD of America, or may be other processor types that would be recognized by one of ordinary skill in the art. Alternatively, the CPU 2120 may be implemented on an FPGA, ASIC, PLD or using discrete logic circuits, as one of ordinary skill in the art would recognize. Further, CPU 2120 may be implemented as multiple processors cooperatively working in parallel to perform the instructions of the inventive processes described above.

The computing device, mobile computing device, or server in FIG. 2B also includes a network controller 2106, such as an Intel Ethernet PRO network interface card from Intel Corporation of America, for interfacing with network 2200. As can be appreciated, the network 2200 can be a public network, such as the Internet, or a private network such as an LAN or WAN network, or any combination thereof and can also include PSTN or ISDN sub-networks. The network 2200 can also be wired, such as an Ethernet network, or can be wireless such as a cellular network including EDGE, 3G and 4G wireless cellular systems. The wireless network can also be Wi-Fi, Bluetooth, or any other wireless form of communication that is known.

The computing device, mobile computing device, or server further includes a display controller 2108, such as a NVIDIA GeForce GTX or Quadro graphics adaptor from NVIDIA Corporation of America for interfacing with display 2110, such as a Hewlett Packard HPL2445w LCD monitor. A general purpose I/O interface 2112 interfaces with a keyboard and/or mouse 2114 as well as a touch screen panel 2116 on or separate from display 2110. General purpose I/O interface also connects to a variety of peripherals 2118 including printers and scanners, such as an OfficeJet or DeskJet from Hewlett Packard.

The general purpose storage controller 2124 connects the storage medium disk 2104 with communication bus 2126, which may be an ISA, EISA, VESA, PCI, or similar, for interconnecting all of the components of the computing device, mobile computing device, or server. A description of the general features and functionality of the display 2110, keyboard and/or mouse 2114, as well as the display controller 2108, storage controller 2124, network controller 2106, and general purpose I/O interface 2112 is omitted herein for brevity as these features are known.

One or more processors can be utilized to implement various functions and/or algorithms described herein, unless explicitly stated otherwise. Additionally, any functions and/or algorithms described herein, unless explicitly stated otherwise, can be performed upon one or more virtual processors, for example on one or more physical computing systems such as a computer farm or a cloud drive.

Reference has been made to flowchart illustrations and block diagrams of methods, systems and computer program products according to implementations of this disclosure. Aspects thereof are implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

The functions and features described herein may also be executed by various distributed components of a system 2020. For example, one or more processors may execute these system functions, wherein the processors are distributed across multiple components communicating in a network. The distributed components may include one or more client and server machines, which may share processing, as shown on FIG. 2C, in addition to various human interface and communication devices (e.g., display monitors, smart phones, tablets, personal digital assistants (PDAs)). The network may be a private network, such as a LAN or WAN, or may be a public network, such as the Internet. Input to the system 2020 may be received via direct user input and received remotely either in real-time or as a batch process. Additionally, some implementations may be performed on modules or hardware not identical to those described. Accordingly, other implementations are within the scope that may be claimed.

In some implementations, the described herein may interface with a cloud computing environment 2230, such as GOOGLE Cloud Platform™ to perform at least portions of methods or algorithms detailed above. The processes associated with the methods described herein can be executed on a computation processor, such as the GOOGLE Compute Engine by data center 2234. The data center 2234, for example, can also include an application processor, such as the GOOGLE App Engine, that can be used as the interface with the systems described herein to receive data and output corresponding information. The cloud computing environment 2230 may also include one or more databases 2238 or other data storage, such as cloud storage and a query database. In some implementations, the cloud storage database 2238, such as the GOOGLE Cloud Storage, may store processed and unprocessed data supplied by systems described herein.

The systems described herein may communicate with the cloud computing environment 2230 through a secure gateway 2232. In some implementations, the secure gateway 2232 includes a database querying interface, such as the GOOGLE BigQuery platform.

The cloud computing environment 102 may include a provisioning tool 2240 for resource management. The provisioning tool 2240 may be connected to the computing devices of a data center 2234 to facilitate the provision of computing resources of the data center 2234. The provisioning tool 2240 may receive a request for a computing resource via the secure gateway 2232 or a cloud controller 2236. The provisioning tool 2240 may facilitate a connection to a particular computing device of the data center 2234.

The network 2200 can represents one or more networks, such as the Internet, connecting the cloud environment 2230 to a number of client devices such as, in some examples, a cellular telephone 2210, a tablet computer 2212, a mobile computing device 2214, and a desktop computing device 2216. The network 2200 can also communicate via wireless networks using a variety of mobile network services 2220 such as WI-FI, BLUETOOTH, cellular networks including EDGE, 3G and 4G wireless cellular systems, or any other wireless form of communication that is known. In some embodiments, the network 2200 is agnostic to local interfaces and networks associated with the client devices to allow for integration of the local interfaces and networks configured to perform the processes described herein.

The disclosed methods improve the speed of the XML synopsis generator and reduce the size of the required storage for the synopsis. The disclosed methods also provide more accurate estimates for various types of QTPs. Subsequently, the disclosed methods enhance the query response time and the interaction between computing devices over the network.

Obviously, numerous modifications and variations of the present disclosure are possible in light of the above teachings. It is therefore to be understood that within the scope of the appended claims, the disclosure may be practiced otherwise than as specifically described herein.

The invention claimed is:

1. A method for selecting a query execution plan, the method comprising:

receiving an XML document including a plurality of root nodes and a plurality of leaf nodes;

determining, via processing circuitry, root-to-leaf paths based on the plurality of root nodes and the plurality of leaf nodes;

generating, via the processing circuitry, a prime number for each unique root-to-leaf path;

calculating, via the processing circuitry, a number of instances in which each prime number appears;

generating, via the processing circuitry, an XML synopsis based on the prime numbers and the number of instances;

generating a set of query tree pattern plans corresponding to the XML synopsis;

determining, via the processing circuitry, a comparison between a query tree pattern and the XML synopsis to identify all subtrees of the synopsis that match the query tree pattern, wherein the comparison between a query tree pattern and the XML synopsis corresponds to logical operators including AND, OR, and NOT;

determining, via the processing circuitry, a type of the query tree pattern;

calculating, via the processing circuitry, for each query tree pattern plan, a selectivity estimate based on the identified subtrees and the type of the query tree pattern;

determining, via the processing circuitry, an optimal query execution plan for performing a query of the XML document based on the selectivity estimate; and selecting, via processing circuitry, the optimal query execution plan for performing a query of the XML document based on the determination, wherein the comparison between a query tree pattern and the XML synopsis includes determining whether all elements of a subtree of the XML synopsis match the query tree pattern that includes the AND logical operator, determining whether at least one element of a subtree of the XML synopsis matches the query tree pattern that includes the OR logical operator, and determining whether truth values of all elements of a subtree of the synopsis are opposite truth values of the query tree pattern that includes the NOT logical operator.

2. The method of claim 1, further comprising:
outputting the optimal query execution plan for performing a query of the XML document.

3. The method of claim 1, further comprising:
performing a query of the XML document based on the optimal query execution plan.

4. The method of claim 1, further comprising:
performing a preorder traversal of the XML document; and
merging identical root-to-leaf paths.

5. The method of claim 1, further comprising relabeling the XML synopsis via a range-labeling scheme.

6. The method of claim 1, wherein each of the plurality of root nodes and the plurality of leaf nodes includes a vector corresponding to a node start, end, level and count.

7. The method of claim 1, wherein the type of the query tree pattern includes at least one of linear, existential, and regular.

8. The method of claim 1, wherein the selectivity estimate is equal to the number of instances when the type of the query tree pattern is at least one of linear and existential.

9. The method of claim 1, wherein the determination of the optimal query execution plan for performing a query of the XML document is based on an amount of processing resources.

10. The method of claim 1, wherein the determination of the optimal query execution plan for performing a query of the XML document is based on a response time.

11. The method of claim 1, wherein the determination of the optimal query execution plan for performing a query of the XML document is based on an amount of storage resources.

12. The method of claim 1, further comprising storing the generated synopsis in memory.

13. The method of claim 1 further comprising using one or more cursors to point to a set of nodes and checking whether the set of nodes form a subtree that matches the query tree pattern.

14. The method of claim 13, further comprising
checking the type of the query tree pattern; and
setting, when the type of the query tree pattern is linear or existential, a partial estimate to a subtree count associated with the set of nodes.

15. A system for a querying an XML database, the system comprising processing circuitry configured to:
receive an XML document having a plurality of root nodes and a plurality of leaf nodes;
determine a set of root-to-leaf paths based on the plurality of root nodes and the plurality of leaf nodes;
generate a prime number for each unique root-to-leaf path;
calculate a number of instances in which each prime number appears;
generate an XML synopsis based on the prime numbers and the number of instances;
generate a set of query tree pattern plans corresponding to the XML synopsis;
determine a comparison between a query tree pattern and the XML synopsis to identify all subtrees of the synopsis that match the query tree pattern, wherein the comparison between a query tree pattern and the XML synopsis corresponds to logical operators including AND, OR, and NOT;
determine a type of the query tree pattern;
calculate, for each query tree pattern plan, a selectivity estimate based on the identified subtrees and the type of the query tree pattern;
determine an optimal query execution plan for performing a query of the XML document based on the selectivity estimate; and
select the optimal query execution plan for performing a query of the XML document,
wherein the comparison between a query tree pattern and the synopsis includes
determining whether all elements of a subtree of the XML synopsis match the query tree pattern that includes the AND logical operator,
determining whether at least one element of a subtree of the XML synopsis matches the query tree pattern that includes the OR logical operator, and
determining whether truth values of all elements of a subtree of the synopsis are opposite truth values of the query tree pattern that includes the NOT logical operator.

16. The system of claim 15, the processing circuitry further configured to:
output the selected query tree plan for performing a query of the XML document.

17. The system of claim 15, further comprising:
a user interface configured to receive a query tree pattern from a user; and
the processing circuitry is further configured to generate a parsed query tree pattern based on the query tree pattern.

18. The system of claim 15, wherein the type of the query tree pattern includes at least one of linear, existential, and regular.

* * * * *